No. 665,013. Patented Jan. 1, 1901.
J. T. JONES.
MILK CAN.
(Application filed June 30, 1900.)
(No Model.)
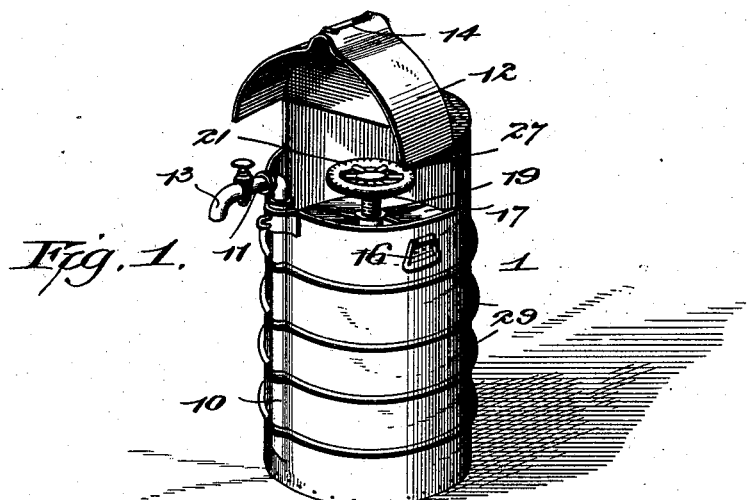
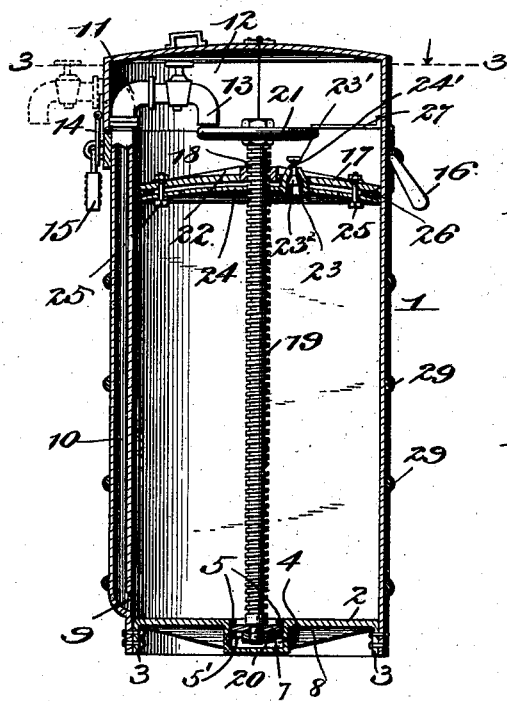
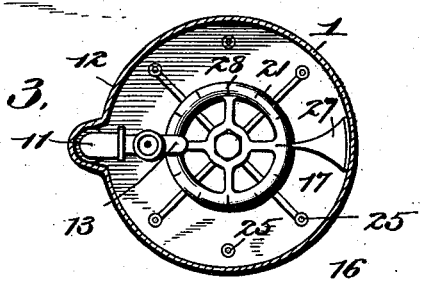
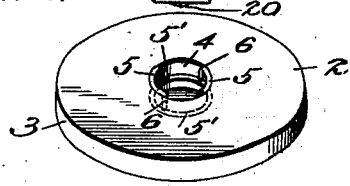
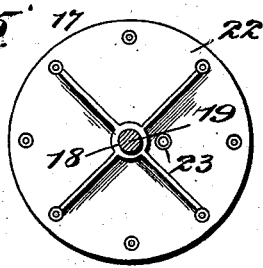
Witnesses
Inventor:
Jeremiah T. Jones,
By
Attorneys
THE NORRIS PETERS CO., PHOTO-LITHO., WASHINGTON, D. C.

UNITED STATES PATENT OFFICE.

JEREMIAH T. JONES, OF CLAY CITY, INDIANA.

MILK-CAN.

SPECIFICATION forming part of Letters Patent No. 665,013, dated January 1, 1901.

Application filed June 30, 1900. Serial No. 22,145. (No model.)

*To all whom it may concern:*

Be it known that I, JEREMIAH T. JONES, a citizen of the United States, residing at Clay City, in the county of Clay and State of Indiana, have invented a new and useful Milk-Can, of which the following is a specification.

My invention relates to milk-cans, and has for one object to produce a can in which the milk can be placed under pressure and kept from exposure to the atmosphere, whereby it may be kept sweet for a longer time than if not placed under such conditions. This arrangement of the can will permit of the milk being transported long distances without becoming sour, thereby particularly adapting it for use for the purpose of shipping the milk upon the cars or for delivering it in wagons.

Another object is to provide a can without projecting faucets, thereby avoiding the possibility of breakage and loss of milk from accident.

Another object is to provide the device with means by which the quantity of milk delivered can be determined without the use of a separate vessel in which it is measured.

A still further object is to so construct the can that it may be quickly taken apart and thoroughly cleansed in order to prevent any particle of sour milk remaining in the can to come in contact with and quickly contaminate the charge of fresh milk therein.

With these objects in view my invention consists in the improved construction and novel arrangement of parts of a can, as will be hereinafter more fully set forth.

In the accompanying drawings, forming a part of this specification, Figure 1 is a perspective view of a milk-can embodying my invention. Fig. 2 is a vertical sectional view of the same. Fig. 3 is a transverse sectional view. Fig. 4 is a detailed top plan view of the bottom. Fig. 5 is a similar view of the follower.

In practicing my invention I form the can-body 1 of any suitable size and dimensions and from any suitable material, preferably from tin or other non-corrosive material. The bottom 2 of the can is preferably formed with a flange 3, which slips into the lower end of the can and is rigidly secured thereto in any desired manner—as, for instance, by means of rivets. The upper surface of the bottom of the can is provided with a central recess or cavity 4, within which are located two segmental ribs or beads 5 and a circular bead 5'. These beads may be formed from pieces of wire or small rods, which are secured to the wall of the recess, or the wall may be stamped to form bead-like projections. Each of the segmental beads preferably extends about one-quarter of the way around the recess and the circular bead is between them and the bottom. Stops 6 are formed at the ends of the segmental beads, against which the ends of a plate 7 engage, as will be hereinafter explained. The plate is of substantially the same length or diameter as the recess and a trifle narrower at its ends than the distance between the ends of the beads, so that it may be passed down between them.

The lower face of the bottom is preferably provided with radially-arranged ribs 8, which give to it the desired strength to prevent injury to the can. The side of the can directly above the bottom is provided with an opening 9, from which a conduit 10 extends to the top of the can upon the exterior. This conduit or pipe is preferably formed crescent-shaped in cross-section, as by securing the edges of a trough-shaped pipe at its edges to the side of the can. A discharge-pipe 11 is swiveled to the upper end of the conduit, so that when not in use its free end can be moved over the central portion of the can and be covered or protected by the cover 12, said cover being preferably hinged across the top of the can. The free end of the discharge-pipe is provided with a faucet or stop-cock 13, by means of which the pipe can be closed or opened for the passage of the milk. The cover is preferably provided with a hasp 14, by means of which it can be secured to the side of the can by any suitable lock 15, thereby preventing the possibility of milk being taken from the can by any one not authorized to do so. Suitable handholds 16 are secured to the sides of the can in the usual manner for lifting the can and carrying it from place to place.

Arranged within the can is a suitable follower 17, which is provided at its center with a screw-threaded perforation 18, through which passes a screw-threaded stem or rod 19.

The lower end of the rod is reduced to pass through the plate 7 and is also screw-threaded for the reception of a nut 20. The screw-threads upon the reduced portion are arranged reversely to those upon the main portion of the rod, so that as the rod is being rotated for screwing the follower down toward the bottom of the can the nut 20 will not be unscrewed from the lower end. The stops at the ends of the segmental beads are also so arranged that as the rod is rotated for screwing the follower the plate will not be rotated, so as to withdraw its ends from under the beads 5. The bead 5' is located at such a distance above the bottom of the recess that the end of the rod 19 or nut 20 will not engage with the bottom when the parts are assembled, and thereby the danger of making a hole in the bottom is avoided. A suitable hand-wheel 21 is secured to the upper end of the rod 19 in any suitable manner, by means of which the rod may be rotated and the follower moved toward the bottom of the can.

The follower comprises a ribbed plate 22, which is nearly the same diameter as the interior diameter of the can and is provided with a suitable valved air-outlet 23. An annular plate 24 is secured to the under side of the plate 22 by means of suitable bolts 25. An expansible packing 26 is secured between the outer edges of the two plates 22 and 24 in position to be forced against the side of the can with greater or less pressure by means of the bolt 25, thereby preventing the possibility of any milk escaping from under the follower after the can has been filled and properly adjusted.

The lower face of the follower is preferably made slightly concave, and the valve is located at the upper portion thereof, so that as the follower is moved down upon the top of the milk all of the air will be forced out through the valve. The form of valve I prefer using for the escape of the air consists of a stem 23', the lower end of which is provided with a cone-shaped valve $23^2$, which is adapted to fit upon a corresponding seat in the follower. A coiled spring 24' fits upon the valve-stem and is so arranged as to hold the spring open when there is air in the can; but after the air has been expelled through the valve by the downward movement of the follower the pressure of the milk against the valve-head will force it against its seat, and thereby prevent the escape of the milk.

If desired, a separate measuring vessel may be dispensed with by providing the interior of the can with an indicator 27, which extends over the hand-wheel 21 and by means of suitable marks 28 upon the wheel will indicate the amount of milk that will be forced out of the can by rotating the rod any predetermined distance. The position of the marks upon the top of the wheel may be determined in any suitable manner—as, for instance, by filling the can, turning the wheel and measuring the amount of milk discharges, and locating a suitable mark opposite the indicator for the different amounts of milk that are forced out of the can by the rotation of the wheel. I prefer to so adjust the parts relatively to each other that one complete rotation of the wheel will expel one quart of milk; but of course any other desired quantity may be expelled If desired, suitable bands or strengthening-hoops 29 may be placed around the exterior of the can at suitable distances apart to give the can the desired strength and rigidity to withstand the weight and pressure from the milk within. Other changes can also be made, and I reserve the right to make such variations and alterations in the form and construction of my improved milk-can as will come within the scope of my invention.

In using my invention the hand-wheel and follower are removed from the screw-threaded rod and the desired quantity of milk is poured into the can. The follower and hand-wheel are then placed in position, and the rod is rotated until the follower has been brought into direct contact with the milk, the air between it and the follower being forced outward through the air-vent in the follower. In this condition the can is ready for transportation, and the milk contained therein will remain fresh and sweet, even though the can be subjected to the rough treatment consequent upon being hauled over rough roads in the ordinary dairy-wagons.

The milk being held against any movement whatever by the pressure of the follower, when it is desired to deliver any or all of the milk in the can the cover is opened and the discharge-pipe turned around so as to project beyond the side of the can and the valve therein is opened. The operator then rotates the wheel at the top of the pressure-rod, which will force the follower toward the bottom of the can a sufficient distance to cause the desired amount of milk to be forced out through the discharge-pipe. By continuing the downward movement of the follower the entire contents of the can can be readily forced out through the discharge-pipe. After the can has been emptied in this manner the hand-wheel is rotated in the opposite direction a sufficient distance to withdraw the follower to the top of the can. The screw-threaded rod is then partially rotated until the plate at the lower end of the rod is disengaged from the beads in the bottom of the can, when the entire pressure apparatus, including the rod, follower, and hand-wheel, may be removed from the can and thoroughly cleansed and dried. After the said apparatus has been removed the can can be thoroughly cleansed and dried in the ordinary manner, ready for subsequent use.

Having thus fully described my invention, what I claim as new, and desire to secure by Letters Patent, is—

1. In a milk-can, the combination, with a cylindrical portion of the can, of a flanged bottom permanently secured in the lower end thereof, the side of the can being perforated directly above the bottom, the upper surface of the bottom being provided with a centrally-located recess, a plate therein, a screw-threaded rod secured at its lower end to said plate and having its upper end provided with means for rotating it, and a follower within the can, the center of which is provided with a screw-threaded opening and with an air-valve adjacent thereto, substantially as described.

2. In a milk-can, the combination, with a cylindrical portion, of a flanged and ribbed bottom secured therein, the upper face of said bottom being provided with a central recess, two segmental beads and stops and a circular bead within the recess, a plate within said recess, a screw-threaded rod projecting upwardly therefrom, a nut upon the lower end of the rod below the plate, a follower upon the upper portion of the rod, and means at the upper end of the rod for rotating the same, substantially as described.

JEREMIAH T. JONES.

Witnesses:
GEORGE B. WHEELER,
J. L. O'BRYAN.